(12) United States Patent
DeMaris et al.

(10) Patent No.: US 7,404,174 B2
(45) Date of Patent: Jul. 22, 2008

(54) METHOD FOR GENERATING A SET OF TEST PATTERNS FOR AN OPTICAL PROXIMITY CORRECTION ALGORITHM

(75) Inventors: David L. DeMaris, Austin, TX (US); Mark A. Lavin, Katonah, NY (US); William C. Leipold, Enosburg Falls, VT (US); Daniel N. Maynard, Craftsbury Common, VT (US); Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/710,648

(22) Filed: Jul. 27, 2004

(65) Prior Publication Data

US 2006/0023932 A1    Feb. 2, 2006

(51) Int. Cl.
*G06F 17/50*    (2006.01)

(52) U.S. Cl. .......................................... 716/21; 716/18

(58) Field of Classification Search .............. 716/18–21
See application file for complete search history.

(56) References Cited

U.S. PATENT DOCUMENTS 6,952,818 B2 * 10/2005 Ikeuchi ....................... 430/311

OTHER PUBLICATIONS

Radecka, K., et al., "Design verification by test vectors and arithmetic transfrom universal test set", May 2004, IEEE transactiosn on computers, vol. 53, No. 5., pp. 628-640.*

\* cited by examiner

*Primary Examiner*—Stacy A Whitmore
(74) *Attorney, Agent, or Firm*—Richard M. Kotulak; Hoffman Warnick LLC

(57) ABSTRACT

A method of synthesizing layout patterns to test an optical proximity correction algorithm. The method comprises the steps of: embodying Walsh patterns in a set of Walsh pattern matrices; processing groups of matrices from the set of Walsh pattern matrices to form a set of test matrices; mapping the set of test matrices to a test pattern set.

7 Claims, 4 Drawing Sheets

METHOD FOR GENERATING A SET OF TEST PATTERNS FOR AN OPTICAL PROXIMITY CORRECTION ALGORITHM

BACKGROUND OF INVENTION

1. Technical Field

The present invention relates generally to VLSI design, and more particularly relates to a system and method for testing optical proximity correction algorithms for VLSI design.

2. Related Art

Optical lithography for very large scale integrated (VLSI) circuits is implemented by exposing resist on wafers in a pattern defined by designed shapes on a mask. However, the patterns produced on the wafer normally differ from those designed due to pattern dependent optical distortions when exposure wavelengths are greater than the feature line width. A variety of resolution enhancement techniques, including optical proximity correction (OPC) algorithms, have been devised to compensate for this effect. These OPC algorithms modify the designed layouts in ways so that the actual wafer layout more closely matches the original ideal layout. However, while such OPC algorithms may work for most layouts, they may fail or produce faulty layouts for certain inputted patterns.

To determine whether or not an inputted pattern will cause a faulty result, results can be modeled in software, and analyzed to determine if a faulty layout will occur. However, in order to effectively test an OPC algorithm, a wide variety of patterns must be tested. One problem that arises then is how to create an optimal set of patterns for this testing.

Conventional approaches to test programs include either a collection of actual designs that are used as a test suite, or synthesizing pseudo-random layouts. For the latter technique, a small seed layout is constructed, and variations are produced by making random copies, translations and orientation changes. In both approaches, however, it is unknown how effectively the layout covers the space of possible shape interactions that may reveal flaws in the OPC algorithm. Accordingly, a need exists for efficiently generating a set of test patterns to test OPC algorithms.

SUMMARY OF INVENTION

The present invention addresses the above-mentioned problems, as well as others, by providing a system, method and program product for generating an optimal set of patterns for testing an optical proximity correction algorithm. In a first aspect, the invention provides a method of synthesizing layout patterns, comprising the steps of: embodying Walsh patterns in a set of Walsh pattern matrices; processing at least one matrix from the set of Walsh pattern matrices to form a set of test matrices; and mapping the set of test matrices to a test pattern set.

In a second aspect, the invention provides a system for generating a set of test patterns to test an optical proximity correction algorithm, comprising: a system that generates a set of Walsh pattern matrices; a system that processes groups of matrices from the set of Walsh pattern matrices to form a set of test matrices; and a system that maps the set of test matrices to a test pattern set.

In a third aspect, the invention provides a program product stored on a recordable medium for generating a set of test patterns to test an optical proximity correction algorithm, the program product comprising: means for generating a set of Walsh pattern matrices; means for processing groups of matrices from the set of Walsh pattern matrices to form a set of test matrices; and means for mapping the set of test matrices to a test pattern set.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

Figure 1:
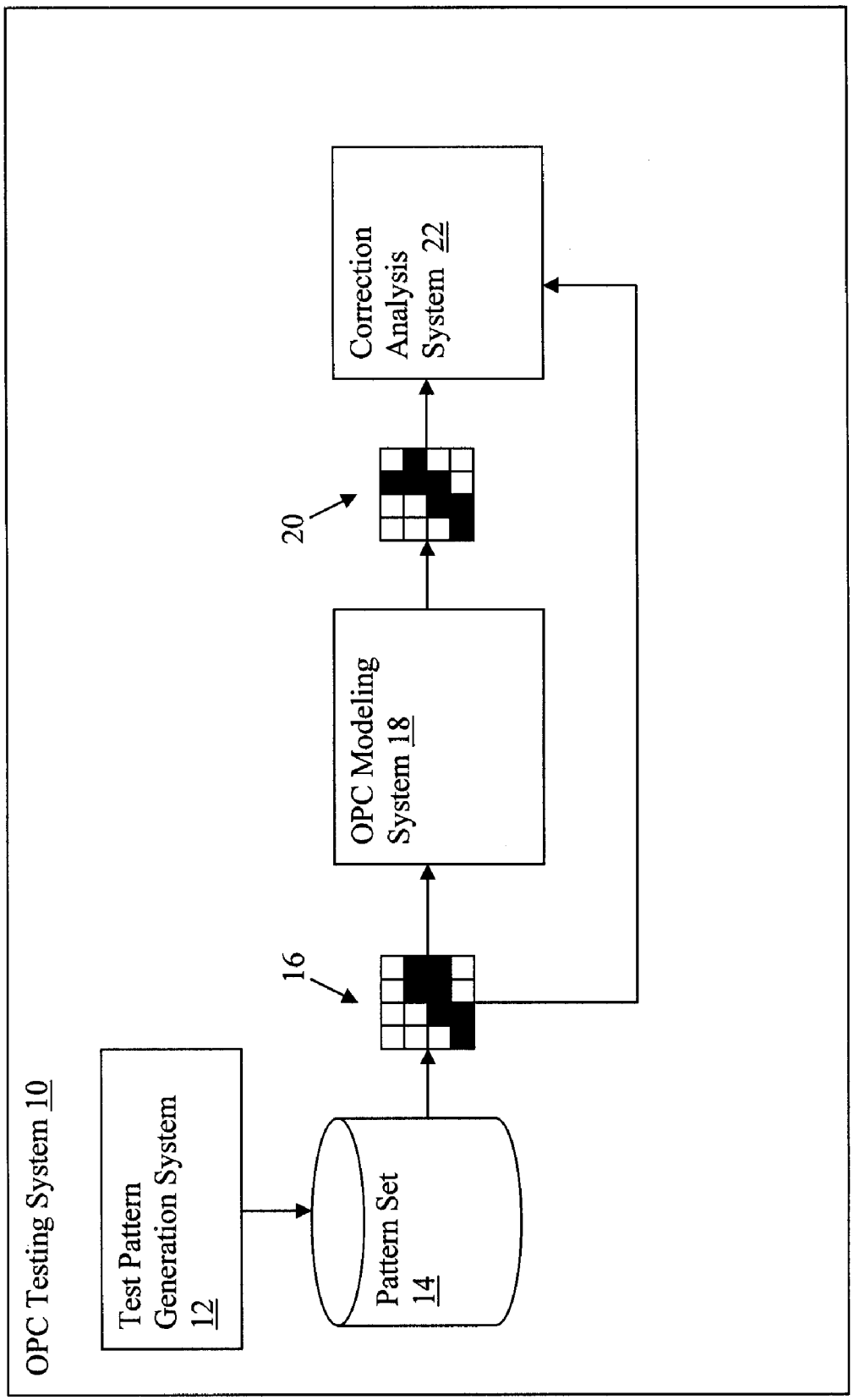
FIG. 1 shows an optical proximity correction algorithm testing system in accordance with the invention.

Referring now FIG. 1, an illustrative optical proximity correction (OPC) testing system 10 is shown. OPC testing system 10 includes a test pattern generation system 12 that generates a pattern set 14 that will be used to test an OPC algorithm. To accomplish this testing, individual patterns 16 are inputted to an OPC modeling system 18 to generate a modeled output 20. Modeled output 20 describes, e.g., how the inputted pattern 16 would translate onto a wafer using a particular OPC algorithm. A correction analysis system 22 can analyze the modeled output 20 to determine if the OPC algorithm will generate a faulty result for the inputted pattern. Thus, OPC modeling system 18 and correction analysis system 22 form a correction process that verifies topological equivalence, e.g., ensuring that no shorts (reduced number of shapes) or opens (increased number of shapes) are created. It should be understood that the OPC testing system 10 shown in FIG. 1 is provided for illustrative purposes only, and that other systems that utilize the test pattern generation system 12 fall within the scope of the invention.

Figure 2:
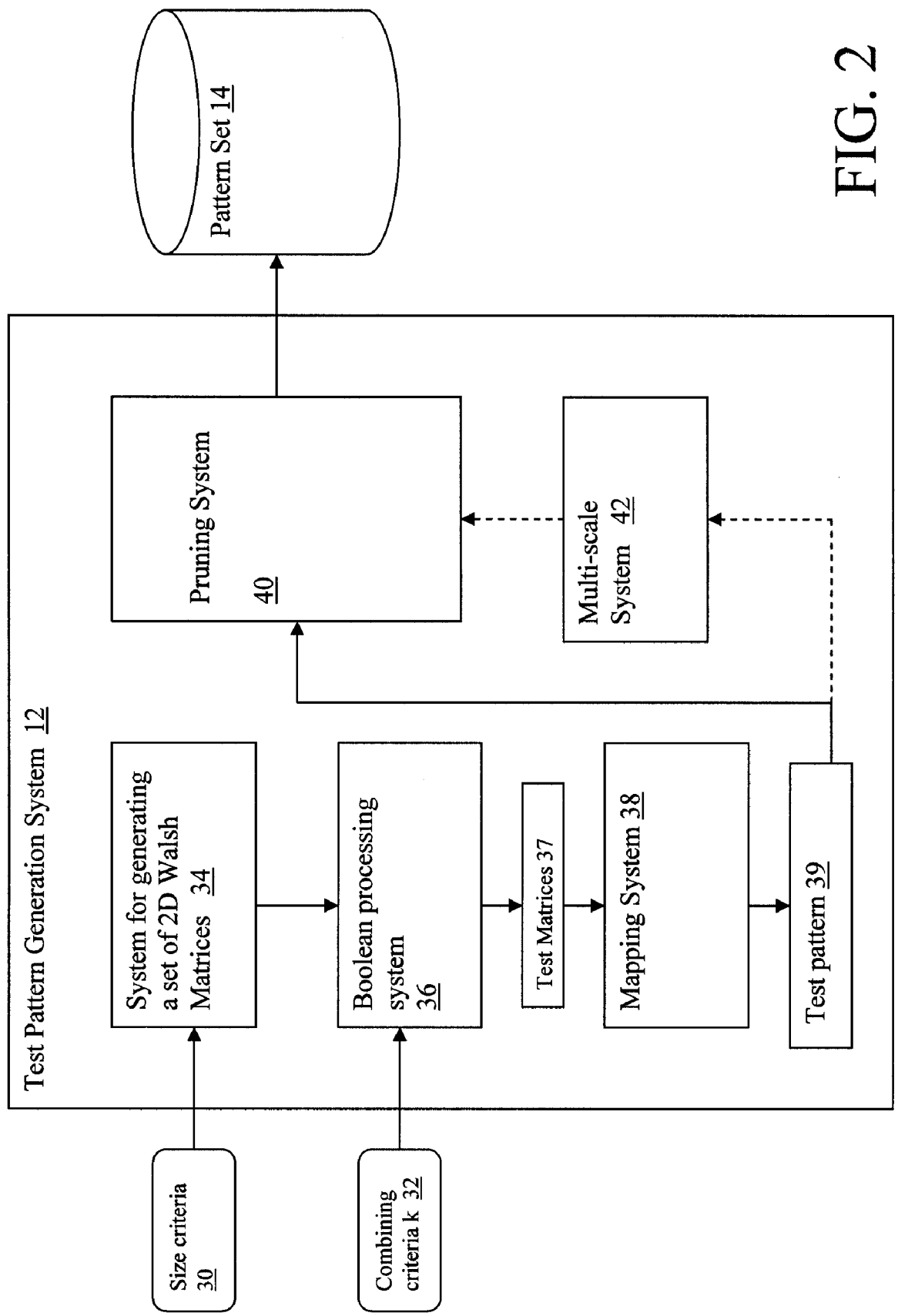
FIG. 2 depicts a test pattern generation system for the testing system of FIG. 1 in accordance with the invention.

Referring now to FIG. 2, a more detailed overview of the test pattern generation system 12 is provided. Test pattern generation system 12 includes a system for generating a set of two-dimensional (2D) Walsh pattern matrices 34, a system for unioning Walsh pattern matrices 36 to generate a set of test matrices 37, and a mapping system 38 that maps each test matrix into a test pattern 39. A pruning system 40 may be provided to eliminate (or include) test patterns based on some predetermined set of rules. Furthermore, a multi-scale system 42 may likewise be included to further refine each generated test pattern 39.

Each of these systems, which are described in further detail below, may be implemented in hardware or software using any type of computer system (not shown). A typical computer system may include a memory, a processing unit, input/output devices (I/O) and a bus. A database may also be provided for storage of data relative to processing tasks. Memory may include a program product that, when executed by the processing unit, implements the various functional capabilities described in further detail below. The computer memory and database may comprise any known type of data storage system and/or transmission media, including magnetic media, optical media, random access memory (RAM), read only memory (ROM), a data object, etc. Moreover, the computer memory and database may reside at a single physical location comprising one or more types of data storage, or be distributed across a plurality of physical systems. The processing unit may likewise comprise a single processing unit, or a plurality of processing units distributed across one or more locations.

The system for generating a set of Walsh pattern matrices 34 may be implemented in any known fashion. The set of Walsh pattern matrices embody a set of Walsh patterns, which are described, e.g., in Richmond, B. J., Optican, L. M., Podell, M., and Spitzer, H., "Temporal encoding of two-dimensional patterns by single units in primate inferior temporal cortex," Neurophysiology 57:132-146, 1987. In one illustrative embodiment, the set of Walsh pattern matrices are generated from an mth order Hadamard matrix. The order may be inputted as a size criteria 30, which dictates the size of the Hadamard matrix, with a first order being 2×2, a second order being 4×4, a third order being 8×8 and so on. Hadamard matrices, which are known in the art and therefore not described in detail, are of the general format:

$$H \text{ (first order)} = \begin{bmatrix} 1 & 1 \\ 1 & -1 \end{bmatrix} \quad H \text{ (}m\text{ order)} = \begin{bmatrix} H(m-1) & H(m-1) \\ H(m-1) & H(m-1) \end{bmatrix}$$

The size criteria 30 may be selected based on any criteria, including available computational resources, etc.

Once an N×N Hadamard matrix is established, a set (of size N*N=n) of Walsh pattern matrices may be generated with the following pseudo code:
Let Hr=Rotate Hadamard matrix by −90
Let Hc=Rotate Hadamard matrix by +180
For each row in Hr
Copy row to each row r of new matrix Htemp
For each column c in Hc
Copy column to each column of new matrix Vtemp.
WPi=pointwise_multiply(Htemp r,Vtemp c).

The result is a set of n Walsh pattern matrices (WP1, WP2, ... WPn). Once the set is established, the −1's in each are replaced with 0's. Next, the set of n Walsh pattern matrices are submitted to the Boolean processing system 36, which in turn generates a set of test matrices 37. In one illustrative embodiment, Boolean processing system 36 "unions" different combinations or groups of matrices from the set of test matrices 37 using a logical "or" function. The number of test matrices in the set 37 may be determined based on an inputted combining criteria k 32, for instance using combinatorial indices for n choose k matrices. Thus, in this embodiment, k determines how many different ways a group (i.e., one or more) of k matrices can be selected from the set of n Walsh pattern matrices. Accordingly, for n=64 (i.e., an 8×8 hadamard matrix) and k=4,635,376 matrices will be generated. It should be understood that any Boolean function (e.g., and, nand, or, nor, xor, etc.) can be used to create the set of test matrices 37 from the set of Walsh pattern matrices.

The selection of k can greatly depend on the available computational resources (e.g., processing time, storage, etc.) to create the resulting set of test matrices 37. Depending on the resources, the largest feasible k can be chosen and will provide the largest overall coverage of possible layouts. The resulting set of test matrices 37 can then be used to build a collection of layout test cases for testing the correctness of layout enhancement software, including optical proximity correction software. Thus, this method, for a given number of tests, will effectively cover the space of possible patterns up to the resolution of the underlying Walsh pattern matrices.

Figure 3:
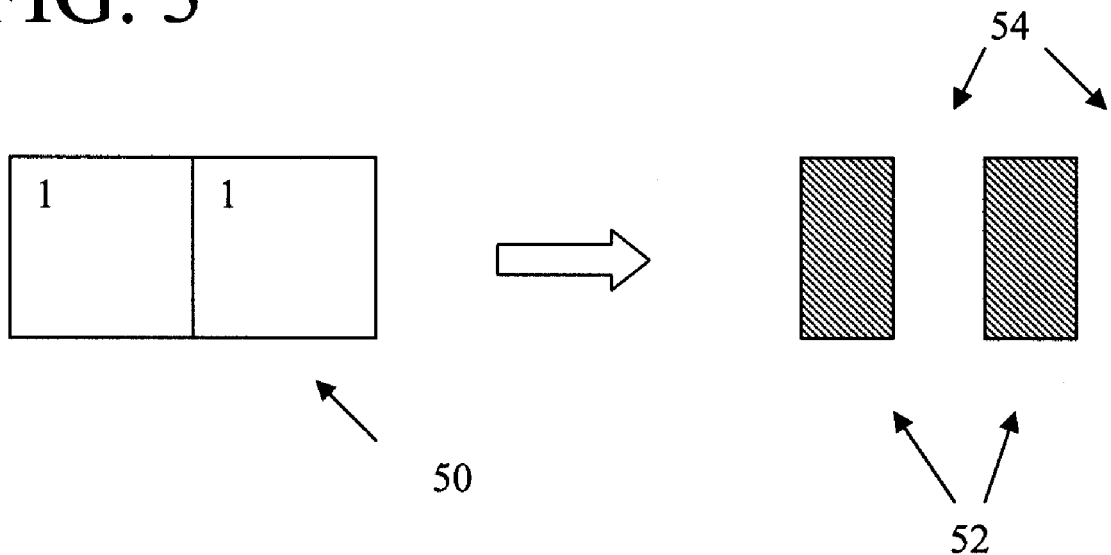
FIG. 3 depicts a pair of tiles generated from two entries in a matrix in accordance with the invention.

Mapping system 38 then converts entries in each matrix to a grid of "tiles" with 1 indicating a level on (i.e., a feature), and 0 indicating a level off (i.e., no feature), where each tile comprises a minimum line width+minimum space. This process is shown in FIG. 3, in which a pair of tiles 50 (each having a value of 1 indicating a level on) are converted into a representation in which each has a minimum line width 52 and a minimum line space 54. Note that that more complex rules/constraints could be added to the mapping process. While most current process technologies have utilized minimum space/width rules, some current and future technologies may have more complex rules which could be incorporated into this step. The mapping step may therefore comprise any type of constraint mapping.

Figure 4:
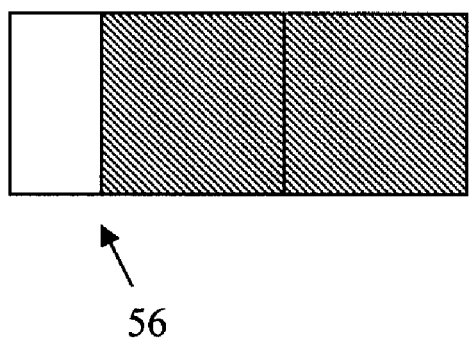
FIG. 4 depicts an enhanced version of the tiles of FIG. 3 in accordance with the invention.
Figure 5:
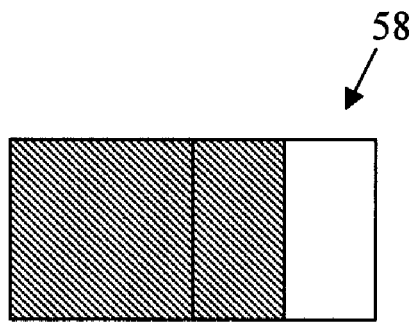
FIG. 5 depicts a second enhanced version of the tiles of FIG. 3 in accordance with the invention.

Mapping system 38 (FIG. 2) may further enhance the process by traversing the grid and looking for transitions from 0 to 1 and 1 to 0. As shown in FIG. 4, if a 0 to 1 transition is found, 0.5*minimum space 56 is added to the shape. If a 1 to 0 transition is found, 0.5*minimum space 58 is subtracted from the shape, as for instance is shown in FIG. 5. This enhancement allows scaling the relationship between matrix cells and shapes to represent a larger area. For instance, with no adjustment, and 8×8 matrix could only represent 4 minimum width/space co-ordinates. By adjusting the shapes by +/−0.5*min spacing, eight minimum width/space structures can be represented by the matrix, although there will be no structures wider than a minimum space. This enhancement can be selectively implemented by mapping system 38 in order to produce greater than minimum size features. Another reason for the enhancement is that without subtraction, shapes that were diagonally coincident would have touching corners. Trimming the tiles back in the x direction ensures that this does not happen.

Figure 6:
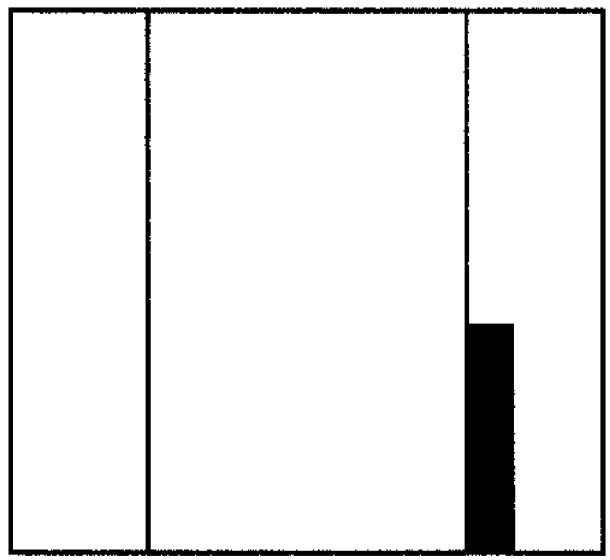
FIG. 6 depicts a further mapping enhancement in accordance with the invention.

An alternative enhancement could be implemented using the following steps: First, generate a matrix as above, then generate a basic grid comprised of a minimum width+ 1.5*minimum space. Then, rather than subtract 0.5*minimum on each edge, generate additional shapes on each edge of each tile to fill extra 0.25 spacing. A resulting pattern that includes decoration 60 is shown in FIG. 6.

Furthermore, as noted above in FIG. 2, a multi-scale system 42 may be included as a further enhancement. This enhancement is intended to account for "region of influence effects," i.e., to account for the fact that lithography and some algorithms (especially model based OPC algorithms) examine shapes over a relatively large window. This process may be implemented as follows:
1. Create shapes by basic or enhanced method.
2. Create a large grid A with a minimum allowable shape density after addition of manufacturing fill shapes. The large grid size is set by lambda/NA, where lambda is the exposure wavelength and NA (numerical aperture).
3. Create a large grid B (size is the same as A) as with maximum allowable shape density, assuming tiling of minimum width and space shapes.
4. Create large grids A" and B" with grids in the opposite orientation.

Further enhancements may include rotating patterns by 45 degrees (in the shape domain, after mapping) and combining them with other generated patterns by unioning to create diagonal lines.

Finally, a pruning system 40 (FIG. 2) may be utilized to control the size of the pattern set 14. This can be utilized to ensure that shapes are chosen which preferentially resemble a real layout, recognizing that not all shape combinations are equally likely. Pruning system 40 may include a corpus, or set of examples, of actual layout regions, and especially a subset of those that have been implicated in problems with correction algorithms. System 40 may choose or reject each generated pattern based on a search for the nearest neighbors in the general layout and the problem layout subset. The distance to the nearest neighbor in feature space can be computed, and a distance threshold can be chosen. This distance threshold might be set differently for a general and a problem corpus. If the distance is less than the threshold for the problem corpus, the pattern can be kept with a high probability. If the distance exceeds the threshold it can be kept with a low probability. Such a methodology is described, e.g., in Watkins, D. Berndt, K. Aebischer, J. Fisher, and L. Johnson, "Breeding Software Test Cases for Complex Systems," Proceedings of the 37th Hawaii International Conference on System Sciences (HICSS 37), Jan. 5-8, 2004

(http://csdl.computer.org/comp/proceedings/hicss/2004/2056/09/205690303c.pdf).

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

For instance, while the disclosed systems and methods are generally directed to the testing of optical proximity correction or other resolution enhancement processes, the use of the pattern synthesis methodology taught herein is not limited to these problems, example, in addition to problem discovery, the patterns may be used in conjunction with search techniques such as those disclosed in "System for Search and Analysis of Systematic Defects in Integrated Circuits," filed on Oct. 30, 2003, Ser. No. 10/605,849, DeMaris et al., which is hereby incorporated by reference. Disclosed therein is a technique for searching new designs for examples of the problem which may then be corrected by designers or automated processes, patterns may also be used to test for intrinsic process sensitivities, and to search new designs for instances of patterns which are so discovered. The patterns found by synthesis and search may be corrected by designers or automated processes.

The invention claimed is:

1. A method of synthesizing layout patterns, comprising the steps of:

embodying Walsh patterns in a set of Walsh pattern matrices;

processing at least one from the set of Walsh pattern matrices to form a set of test matrices, in which a set of combinatorial indices for n choose k matrices are determined, wherein n represents the number of matrices in the set of Walsh pattern matrices, k is the number of matrices in a group of processed matrices, and k is selected as large as possible given a set of computational constraints; and mapping the set of test matrices to a test pattern set.

2. The method of claim 1, wherein the set of Walsh pattern matrices are generated using an Nth order Hadamard matrix, wherein N dictates the size of each matrix.

3. The method of claim 1, wherein the processing step utilizes a Boolean operation.

4. The method of claim 3, wherein the Boolean operation utilizes at least one logical operation selected from the group consisting of: a logical or, logical nor, logical and, and logical nand.

5. The method of claim 1, wherein the mapping step maps matrix entries to tiles in a minimum space, minimum width grid, wherein each tile is assigned a value of either level on or level off.

6. The method of claim 5, wherein the mapping step adjusts spacing of tiles when a transition from on to off, or off to on is detected.

7. The method of claim 1, comprising the further step of pruning the pattern set based on a predetermined set of rules.

\* \* \* \* \*